April 2, 1974 L. M. KUBSH Re. 27,962

ABRASIVE DISC

Original Filed Nov. 16, 1964

INVENTOR
LEROY M. KUBSH
BY Hugh R. Rocke
ATTORNEY

United States Patent Office

Re. 27,962
Reissued Apr. 2, 1974

27,962
ABRASIVE DISC

Leroy M. Kubsh, Beloit, Wis., by Litton Industries, Inc., Hartford, Conn., assignee Original No. 3,426,486, dated Feb. 11, 1969, Ser. No. 411,466, Nov. 16, 1964. Application for reissue Mar. 5, 1973, Ser. No. 338,375
Int. Cl. B24b *55/02;* B24d *5/00, 7/00*
U.S. Cl. 51—356 7 Claims

Matter enclosed in heavy brackets [ ] appears in the original patent but forms no part of this reissue specification; matter printed in italics indicates the additions made by reissue.

ABSTRACT OF THE DISCLOSURE

Abrasive disc for use on disc-type surface grinding machines in which the grinding operation is performed by the annular surface of the abrasive disc. The abrasive disc consists of a body of abrasive material. Distributed uniformly throughout the abrasive disc are inserts of abrasive material substantially harder than that of the body of the disc. The softer abrasive of the disc body will wear more rapidly than that of the inserts, leaving the inserts to perform the grinding operation. The space between the inserts provides for the circulation of coolant to carry away metal chips and abrasive particles from the body of the disc as well as from the inserts.

This invention relates to abrasive wheels, particularly abrasive surface grinding discs in which the grinding operation is performed by the annular surface of the disc, and more particularly, where the surface to be ground is a relatively large area or of material having a high resistance to abrasives.

The term "surface grinding discs" as used here includes all rotatable abrasive devices which have annular operative faces whether in the form of solid discs, segmental discs, or ring or cup-shaped discs.

The efficiency of an abrasive disc is limited by the fact that when a relatively large abrasive surface is applied to a work surface, there is a high degree of resistance to penetration of the work surface by the abrasive material in proportion to the area and nature of the material. Excessive force must be exerted on the discs to effect sufficient penetration of the abrasive grains into the workpiece to provide a satisfactory rate of stock removal. Such force results in heat generation and in deformation in various parts of the machine which interfere with the accuracy of the grinding operation.

One method of improving the penetrating qualities of an abrasive disc is to reduce the area of abrasive which engages the workpiece by providing the disc with a plurality of openings such as spaced holes large enough to effect a substantial reduction in abrasive area. With this arrangement, the area of sections of abrasives between the holes represents a reduction in total area of abrasive surface in contact with the workpiece with some improvement in penetration.

Previous attempts to provide a disc having spaced abrasive elements consisted in the use of various shapes of abrasive material embedded in a non-abrasive matrix. The non-abrasive matrix was softer than the abrasive elements, but offered greater resistance to wear because it did not disintegrate or break down in response to contact with the work surface. This resistance to wear represents a corresponding resistance to the rotation of the disc with the result of high motor loads without corresponding stock removal.

This problem is solved in the present invention by embedding or inserting the abrasive elements in a somewhat softer abrasive matrix so that when the matrix engages a work surface, there is some stock removal with a controlled break down of the abrasive matrix compared to the break down of the abrasive elements. The result of this combination is that the abrasive elements extend beyond the surface of the matrix. The abrasive matrix breaks away at such a rate that it offers much less resistance to rotation of the disc than a non-abrasive matrix.

It is, therefore, an object of the present invention to provide an abrasive disc which will have a high degree of penetration, a high rate of stock removal, and a low rate of heat generation.

Another object is to provide an abrasive disc having a plurality of abrasive elements embedded in a matrix which wears or breaks away in such a manner as to keep the abrasive elements exposed while providing adequate support for the cutting action of said abrasive elements.

Another object is to provide an abrasive disc having a plurality of abrasive elements embedded in an abrasive matrix.

Another object is to provide an abrasive disc constructed so that coolant may circulate freely between the disc and the surface being ground.

Another object is to provide an abrasive disc consisting of a plurality of spaced abrasive elements in an abrasive matrix in which the rate of wear of the matrix relative to that of the abrasive elements is such that said elements always extend slightly from the matrix.

If the matrix wears too fast, the abrasive elements or plugs extend farther and also wear faster without a corresponding increase in stock removal.

Therefore, another object is to control the wearing characteristics of the matrix and plugs so that said plugs always extend beyond the matrix by an amount which will assure a maximum rate of stock removal consistent with the maximum support for the plugs.

Figure 1:
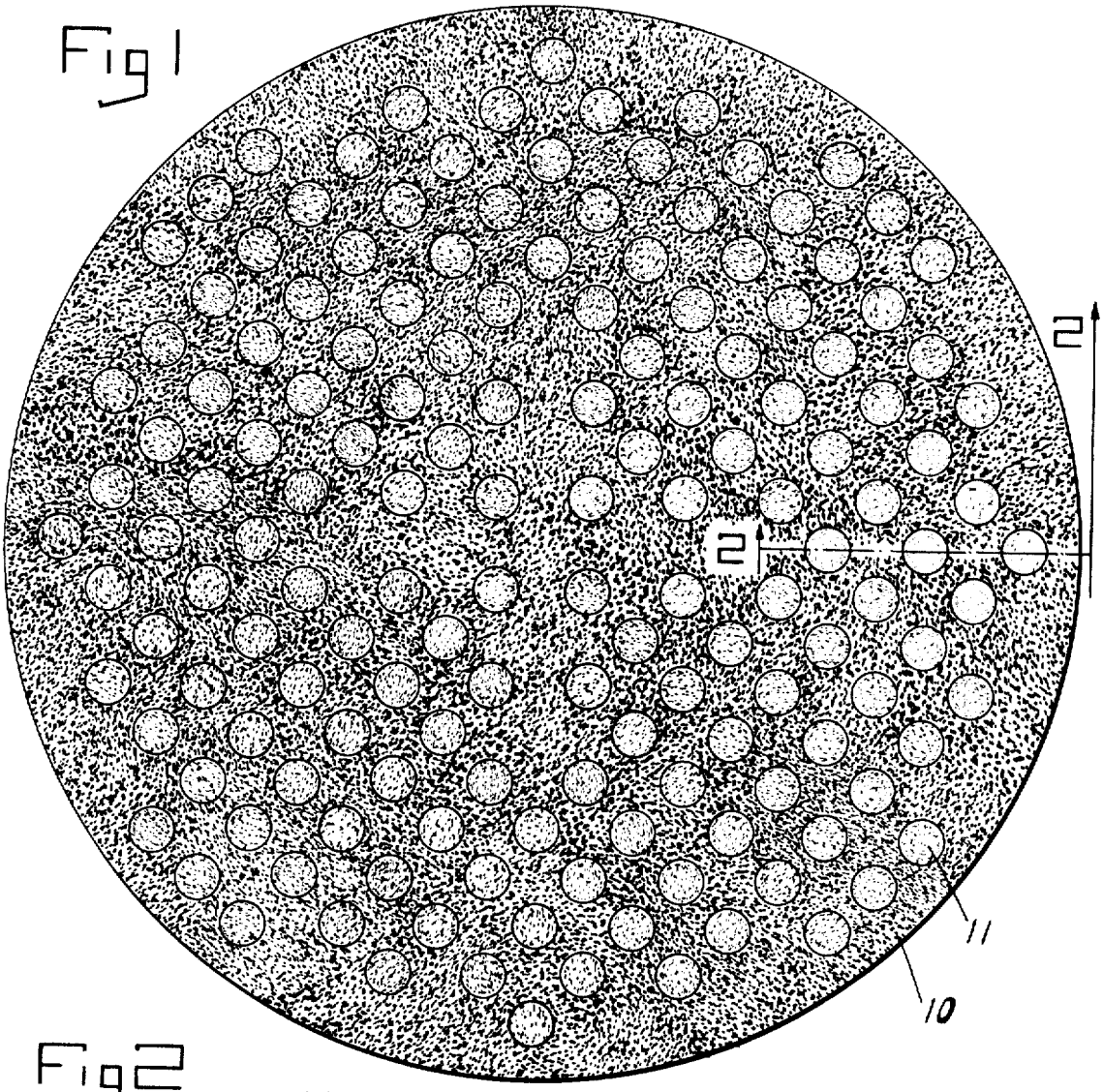
FIG. 1 shows an abrasive disc having inserted or embedded abrasive elements.
Figure 2:
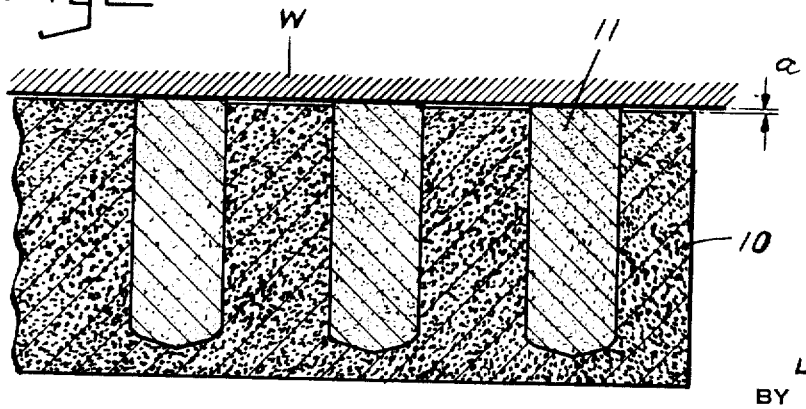
FIG. 2 is a section on the line 2—2 of FIG. 1.

Numeral 10 indicates the body or matrix of an abrasive disc. Abrasive plugs or elements 11 consisting of inserts of abrasive particles and bond of harder composition than the body of the disc may be incorporated in the matrix 10 in any one of several ways.

(1) Forming holes in the abrasive mix for the body of the disc, filling the holes with a different abrasive mix and curing the combination in accordance with the requirements of the bond material.

(2) Forming the body of the disc in the same manner as in (1), inserting pre-formed abrasive elements in the holes and curing the combination.

(3) Forming the body of a disc as in (1) and (2), curing the body with the holes already formed therein and inserting previously cured abrasive elements and securing them in the body by a suitable adhesive.

(4) A random mix of pre-formed abrasive elements in an abrasive matrix.

Another arrangement which is the reverse, but not the equivalent, of those mentioned above is one in which the body of the disc is hard abrasive with cored openings to be filled with a softer abrasive matrix.

Regardless of the method of forming the disc, the nature of the combination of abrasive elements and matrix, and the hardness of the abrasive matrix and that of the abrasive elements, must be so balanced that the matrix will provide a firm support for said elements and will wear away just enough faster than said abrasive elements to keep said elements extending slightly beyond the surface of said matrix.

The composition of the abrasive elements may be designed primarily for efficient stock removal. The composition of the matrix may be designed primarily for a controlled rate of wear as well as strength to support the abrasive elements firmly for grinding.

The portion a of abrasive elements 11 may be extend as much as .002" from the matrix. This amount may vary with different combinations of abrasive elements and matrix. The space provided between the work and the matrix by the abrasive elements serves to permit the circulation of coolant around each abrasive element so as to dissipate heat generated by the grinding operation at the point of generation.

Operation

When a disc is first put into use, the abrasive elements 11 may be flush with the matrix 10. After a short period of grinding a workpiece W, the matrix 10, being softer, will wear away, leaving the abrasive elements 11 extending slightly from the matrix 10. As the abrasive elements 11 wear, the matrix will continue to wear enough to maintain its surface slightly below that of the abrasive elements. Coolant will be free to circulate in the space between the surfaces of workpiece W and the matrix 10 and around the abrasive elements 11 so that heat generated by the grinding operation may be dissipated directly at the point where it is generated, and abrasive particles from the matrix 10 will be carried rapidly away from the grinding zone by the coolant. This keeps both the workpiece W and the disc at a low temperature and permits stock removal at a rate which would cause burning of the workpiece if attempted with conventional discs.

I claim:

1. An abrasive disc comprising:

(a) a body of abrasive material, (b) a plurality of bonded abrasive inserts in spaced relation in said abrasive material, (c) the material in said abrasive inserts having faster cutting, longer wearing characteristics than the abrasive material of said body.

2. An abrasive disc comprising:

(a) a matrix consisting of a relatively soft abrasive material, (b) bonded abrasive inserts of slightly harder material uniformly distributed in said matrix, (c) whereby said matrix wears faster than said abrasive inserts so that said inserts extend beyond the surface of said matrix.

3. An abrasive disc comprising:

(a) a matrix consisting of a relatively soft abrasive material, (b) bonded abrasive inserts of slightly harder material uniformly distributed in said matrix and extending from the surface of said matrix, (c) whereby circulating coolant flows around each of said inserts during a grinding operation for washing away particles of abrasive and chips of metal or other workpiece material.

4. An abrasive disc comprising:

(a) a matrix consisting of (b) abrasive material of a given grit and bond, (c) abrasive elements of another grit and bond uniformly distributed in said matrix, (d) whereby said matrix wears faster than said abrasive elements so that said elements extend slightly beyond the surface of said matrix.

[5. An abrasive disc of the type wherein grinding is performed by an annular surface of said disc, said disc comprising a matrix (10), a plurality of abrasive elements (11) dispersed in said matrix about said annular surface and being formed of abrasive particles dispersed in a bonding material, said matrix (10) being formed of abrasive particles dispersed in a bonding material, and said matrix (10) and abrasive elements (11) having different wear characteristics.]

6. An abrasive disc [as in claim 5] *of the type wherein grinding is performed by an annular surface of said disc, said disc comprising a matrix (10), a plurality of abrasive elements (11) dispersed in said matrix about said annular surface and being formed of abrasive particles dispersed in a bonding material, said matrix (10) being formed of abrasive particles dispersed in a bonding material, and said matrix (10) and abrasive elements (11) having different wear characteristics* wherein said matrix (10) wears slightly faster than said abrasive elements (11).

7. An abrasive disc [as in claim 5] *of the type wherein grinding is performed by an annular surface of said disc, said disc comprising a matrix (10), a plurality of abrasive elements (11) dispersed in said matrix about said annular surface and being formed of abrasive particles dispersed in a bonding material, said matrix (10) being formed of abrasive particles dispersed in a bonding material, and said matrix (10) and abrasive elements (11) having different wear characteristics* wherein the abrasive particles of said matrix (10) break away from said disc more readily than the abrasive particles of said abrasive elements (11).

[8. An abrasive disc as in claim 5 wherein said abrasive elements (11) wear slightly faster than said matrix (10).]

[9. An abrasive disc as in claim 5 wherein the abrasive particles of said abrasive elements (11) break away from said disc more readily than the abrasive particles of said matrix (10).]

10. An abrasive disc [as in claim 5] *of the type wherein grinding is performed by an annular surface of said disc, said disc comprising a matrix (10), a plurality of abrasive elements (11) dispersed in said matrix about said annular surface and being formed of abrasive particles dispersed in a bonding material, said matrix (10) being formed of abrasive particles dispersed in a bonding material, and said matrix (10) and abrasive elements (11) having different wear characteristics* wherein said abrasive elements (11) extend a small distance outwardly from said matrix (10) whereby coolant can surround the grinding surface of said abrasive elements (11) during a grinding operation.

References Cited

The following references, cited by the Examiner, are of record in the patented file of this patent or the original patent.

UNITED STATES PATENTS

| | | | |
|---|---|---|---|
| 2,309,016 | 1/1943 | Ryan | 51—209 R |
| 2,418,834 | 4/1947 | Homeyer | 51—209 R |
| 2,451,295 | 10/1948 | Metzger | 51—209 R |
| 2,555,001 | 5/1951 | Ohl | 51—209 R X |

FOREIGN PATENTS

| | | | |
|---|---|---|---|
| 172,813 | 7/1906 | Germany | 51—209 R |
| 896,613 | 11/1953 | Germany | 51—209 R |

DONALD G. KELLY, Primary Examiner

U.S. Cl. X.R.

51—209 R